Oct. 29, 1946.  G. H. PHELPS  2,410,129
DEHYDRATOR
Filed March 11, 1943   3 Sheets-Sheet 1

INVENTOR
GEORGE H. PHELPS
BY
*George T. Gill*
ATTORNEY

Oct. 29, 1946.      G. H. PHELPS      2,410,129
DEHYDRATOR
Filed March 11, 1943      3 Sheets-Sheet 2
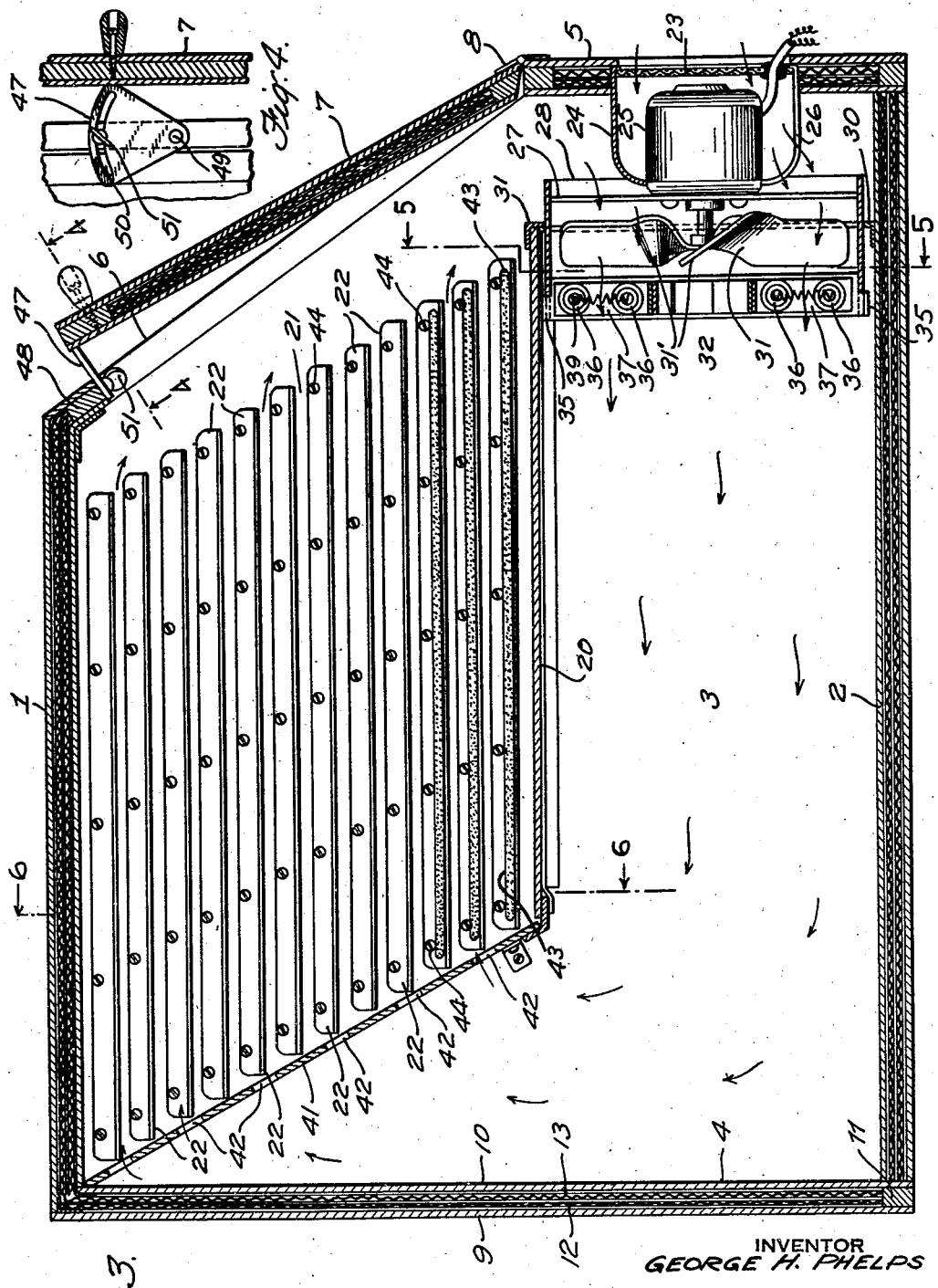
INVENTOR
GEORGE H. PHELPS
BY
George T. Gill
ATTORNEY

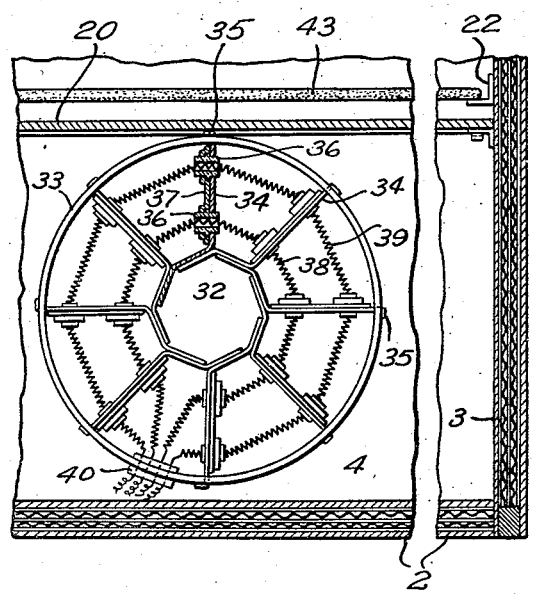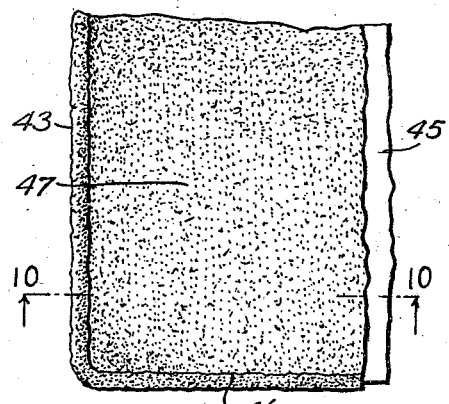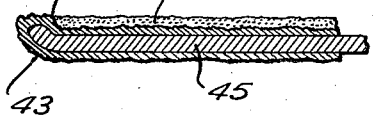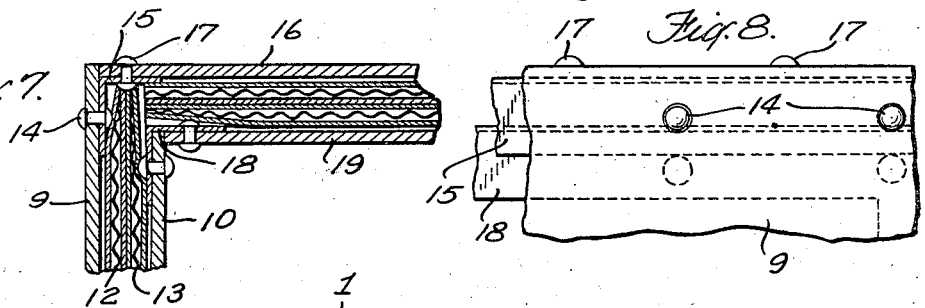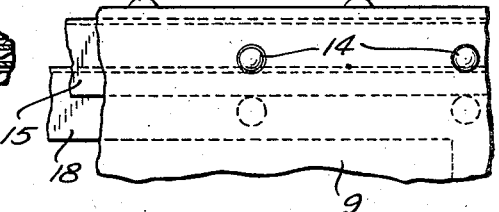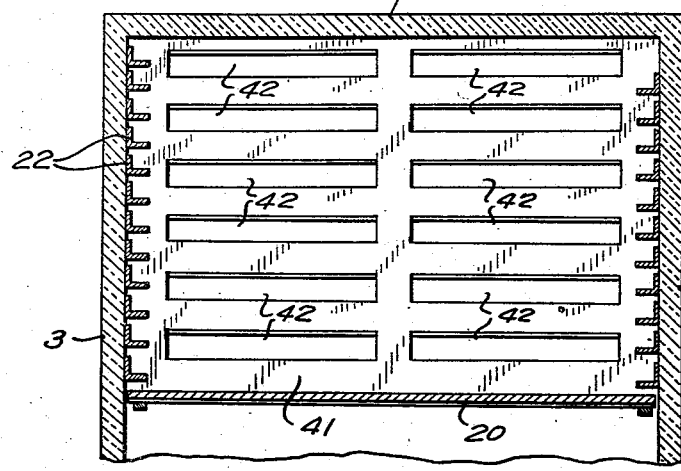

Patented Oct. 29, 1946

2,410,129

UNITED STATES PATENT OFFICE 2,410,129

DEHYDRATOR

George H. Phelps, Floral Park, N. Y., assignor to Metropolitan Device Corporation, Brooklyn, N. Y., a corporation of New York Application March 11, 1943, Serial No. 478,755

2 Claims. (Cl. 34—193)

The invention herein disclosed relates to a dehydrator that is especially suitable for drying fruits and vegetables, and more particularly to a dehydrator unit that is suitable for small farms.

Commonly, dehydrators for drying fruits and vegetables are provided with foraminous trays on which the material to be dried is placed. With foraminous trays, the air circulated through the dryer passes through the trays and results in poor circulation and loss of efficiency and uniformity in dehydration. Also where small berries are dehydrated or other articles are reduced to small particles in the dehydration, they pass through the openings in the trays.

I have found that by providing a dehydrator in which the drying air is caused to circulate in paths over the trays and utilizing solid trays greater efficiency and more uniform dehydration is obtained. Also regardless of the ultimate particle size of the dehydrated material it is retained by the tray. Preferably, a shallow speckled enamel tray is used. With such a tray, the articles to be dried, such as sliced apples, for example, rest upon the rough surface of the tray and the drying air may pass under as well as over the material. Additionally, the air is caused to flow in a path parallel to the tray at the proper velocity determined by the area of the passage; there is no interference by cross-currents passing through the tray. Furthermore, a solid metal tray becomes heated and the heat is distributed uniformly throughout the tray. This tends to maintain an even temperature throughout the passage.

A dehydrator embodying the invention, and illustrated as an example of one embodiment of the invention, is shown in the accompanying drawings in which:

Fig. 3 is a longitudinal, sectional elevation of the dehydrator;

Fig. 4 is a fragmentary section taken on the line 4—4 of Fig. 3;

Fig. 5 is a fragmentary, transverse, sectional elevation taken on the line 5—5 of Fig. 3;

Fig. 6 is a fragmentary, transverse, sectional elevation taken on the line 6—6 of Fig. 3;

Fig. 7 is a fragmentary, sectional plan on an enlarged scale illustrating the corner construction;

Fig. 8 is an elevation of the same;

Fig. 9 is a fragmentary plan of a tray used in the dehydrator;

Fig. 10 is a fragmentary, sectional elevation of the tray illustrated in Fig. 9.

Figure 1:
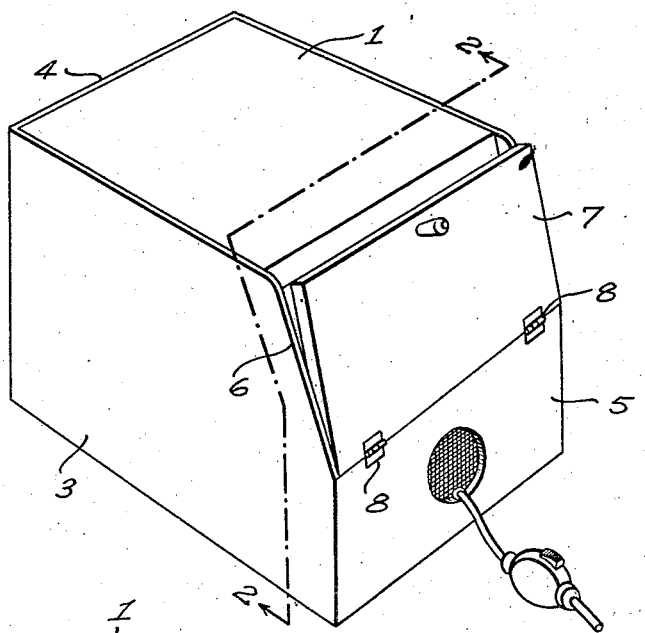
Fig. 1 is an isometric view of the dehydrator.

The dehydrator illustrated in the drawings is a self-contained unit consisting of a cabinet having a top wall 1, a bottom wall 2, side walls 3, a rear wall 4 and a front wall 5. The top 1 is of less length than the bottom and the front edges of the side walls 3 are inclined, as at 6, from the upper edge of the front wall to the top. As illustrated the front wall is short and an opening is closed, or nearly so during dehydration operations by a door 7 that is hinged, as by hinges 8, to the upper edge of the wall 1. With this arrangement, the door 7, when past the vertical position, i. e., when nearly closed, tends to move to the closed position under the force of gravity acting thereon.

The walls of the cabinet are especially designed and constructed to minimize the passage of heat therethrough. All of the walls and the door are constructed in like manner. The rear wall 1, for example, consists of two spaced pieces 9 and 10 of fiber or wood-base wall board secured at the bottom to a spacing strip 11. Between the wall board, there are two pieces of corrugated paper board 12 and 13, arranged with the air cells thereof running horizontally. At the corners, the adjacent wall boards are secured together by angle irons to which they are riveted. Thus, as shown in Figs. 7 and 8, the outer wall board 9 of the wall 1 is secured by rivets 14 to one flange of an angle iron 15, and the outer wall board 16 of the adjacent side wall is secured to the other flange of the angle iron by rivets 17. In like manner, the inner board 10 of the wall 1 is secured to one flange of an angle iron 18 and the inner board 19 of the adjacent side wall is secured to the other flange of the angle iron 18. In this way the cabinet is provided with efficient and inexpensive heat insulating walls, and in no instance do any of the metal securing elements, screws or rivets, extend from the inside of the cabinet to the outside to act as heat conducting elements.

Within the cabinet, there is provided a transverse horizontal partition 20 which extends across the cabinet but which is spaced from the ends of the cabinet. The partition forms within the cabinet a receiving compartment 21, between the partition and the top of the cabinet, for receiving the material to be dehydrated, and an air circulation passage including the receiving compartment and the spaces at the ends of the partition and the space below the partition. Within the receiving compartment there are mounted on the side walls of the cabinet a series of pairs of tray-supporting brackets 22. A pair of brackets includes one on each side wall, both at the same elevation so that a tray resting thereon will be supported horizontally. In the dehydrator illustrated there are twelve pairs of tray supporting brackets, and the brackets are stepped rearwardly in accordance with their elevation above the partition 20. It will be noted, from Figure 3, that the opening served by the door 7 provides free access to the receiving chamber for the insertion and removal of trays.

An air inlet opening is provided through the front wall 5 and it is covered by a screen 23.

Within the opening there is mounted a sheet metal cylindrical partition 24 extending into the cabinet. The inner end of this partition is spun over to engage the case of an electric motor 25. Along the bottom of the partition, there is comparatively wide air passage slot 26 extending longitudinally of the partition. The motor is supported by transverse brackets 27 which extend diametrically of and are secured to a cylindrical air tunnel 28 having a bracket 30 secured to the bottom wall and a bifurcated bracket 31 receiving and secured to the front edge of the partition 20. The shaft of the motor extends into the cylindrical air tunnel 28 and has mounted thereon a fan 31'.

In front of the fan, there is mounted an electric heater designated generally by the numeral 32. This heater extends into the end of the cylindrical air passage 28. As shown in Fig. 5, the heater includes an outer ring 33 and a pluraltiy (eight in number) of inwardly extending heater-wire supports 34. Each support has a tongue 35 formed on its outer end which extends through a slot provided therefor in the ring. The tongues 35 are bent over to secure the supports to the ring. At their inner ends, the supports are bent to form two sides of an octagon. The inner end of each support overlaps the next succeeding support and is secured thereto as by spot welding. Intermediate the ends of each of the supports, there are provided spaced openings in which there is received an insulating bushing 36. These bushings are held in place by a holder 37 that is spot welded to the support. Two resistance or heater wires 38 and 39 are used, one the heater wire 39 passing through the radially outer set of insulating bushings, and the other 38 passing through the other set of bushings. An insulating block 40 is provided in the ring 35 for the lead-in wires to the heater wires.

At the rear of the receiving chamber 21, there is a distribution panel 41 for effecting a uniform distribution of air in the receiving chamber. The panel 41 extends from the rear edge of the partition 20 to the corner formed by the top and rear wall. At alternate brackets 22, there is provided a pair of rectangular openings 42 through the panel. These openings are so located that air passing therethrough will be distributed over and under a tray resting on a pair of brackets. The panel forms with the rear wall a diverging pressure chamber in advance of the receiving compartment relative to the direction of flow of air through the receiving compartment, and an even distribution of air through the several openings 42 in the panel is obtained.

Figure 2:
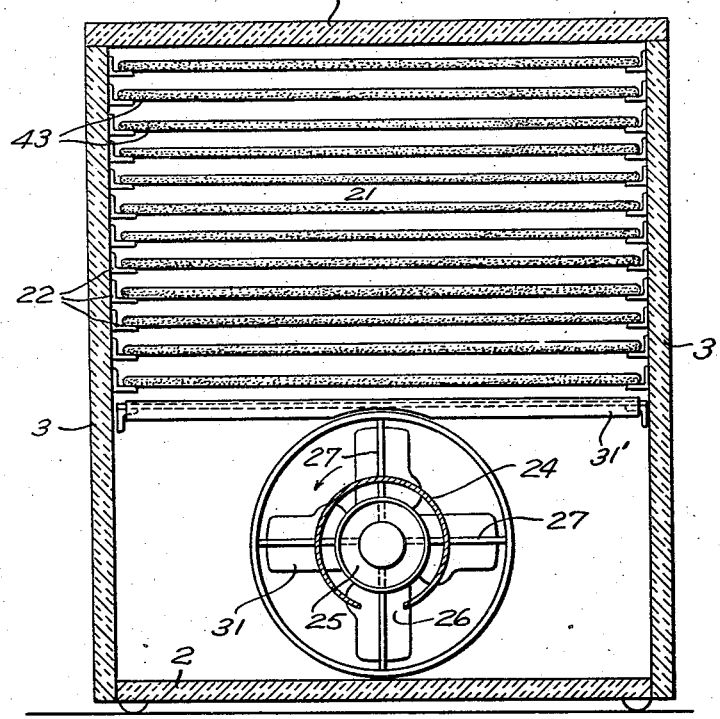
Fig. 2 is a transverse sectional elevation taken on the line 2—2 of Fig. 1.

Trays 43, such as illustrated in Figs. 2, 9 and 10 are used for holding the substance to be dried. Each tray, Figs. 9 and 10, consists of a solid 45 metal bottom and short sloping side walls 46 surrounding the bottom. The tray is enameled with speckled enamel 47. This enamel forms a roughened surface which consists of a series of minute projections. These projections serve to support the material to be dried slightly elevated from the bottom of the tray. Air can thus pass under the material as well as over it. In addition, the material does not come into surface contact with the tray and so does not readily adhere to the tray. In use, the material to be dried is spread out on the trays and the trays are placed on the bracket in the receiving compartment or chamber.

During the drying process, the door 7 is held open various amounts depending upon the nature of the material to be dried or the desired rate of drying. For this purpose there is provided an adjustable door stop 47 mounted on the door jamb 48. The door stop consists of a bracket that is a sector of a circular disk and which is pivoted at 49 to the door jamb. Adjacent its outer edge it has an arcuate slot 50 through which a clamping thumb screw 51 extends. By loosening the thumb screw, the bracket may be moved about the pivot to extend beyond the door jamb any desired amount within the limit of the slot. It may be fixed in any set position by tightening the thumb screw. The bracket is positioned to engage the door 7 and so hold the door open slightly.

In operation, the fan causes the air within the cabinet to circulate through the circulation passage. From the fan the air passes through the heater by which its temperature, and in consequence its moisture absorbing capacity, is raised. The air then flows to the pressure chamber and it is distributed by the panel 41 over and under each tray uniformly. As it passes from the receiving chamber, part of the air passes out through the opening at the door and the remainder is recirculated. That portion of the air that passes out of the cabinet is replaced by air drawn in through the inlet 23. By virtue of the partition 24, the motor 25 is subjected to air at room temperature and not to the elevated temperature of the air within the cabinet.

Because of the solid trays, the space between the trays form separate air passages for the heated air. There is no circulation of air vertically between passages and the air is thus circulated uniformly. Also the air is free to pass along the bottom of each tray between the bottom and the substance being dried. The solid metal trays absorb heat from the air and distribute the heat so that there is fairly uniform drying throughout the tray.

It is to be understood that it is not desired to be limited to the exact details of construction shown and described, for obvious modifications will occur to a person skilled in the art.

I claim:

1. In a dehydrator especially suitable for dehydrating fruits and vegetables and comprising a cabinet having an air passage therein, means for causing air to pass through the air passage and a series of tray supports within the passage; a plurality of solid trays on the supports and extending from side wall to side wall of the air passage, each tray having a roughened surface which consists of irregular, closely related, minute projections, whereby fruits or vegetables placed thereon are supported by the projections and out of contact with the tray.

2. In a dehydrator especially suitable for dehydrating fruits and vegetables and comprising a cabinet having an air passage therein, means for causing air to pass through the air passage and a series of tray supports within the passage; a plurality of solid trays on the supports and extending from side wall to side wall of the air passage, each tray having a solid metal bottom and sloping side walls surrounding the bottom and enameled with speckled enamel forming a roughened surface consisting of irregular, closely related, minute projections, for supporting material thereon slightly elevated from the bottom of the tray, whereby air may pass between the material and the tray.

GEORGE H. PHELPS.